United States Patent
Tajima et al.

(10) Patent No.: US 10,252,639 B2
(45) Date of Patent: Apr. 9, 2019

(54) EXTERNAL POWER SUPPLY APPARATUS AND VEHICLE POWER SUPPLY METHOD

(71) Applicant: HONDA MOTOR CO., LTD., Tokyo (JP)

(72) Inventors: Takamitsu Tajima, Wako (JP); Yasuji Shibahata, Wako (JP); Wataru Noguchi, Wako (JP); Tomohisa Aruga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 15/128,822

(22) PCT Filed: Feb. 19, 2015

(86) PCT No.: PCT/JP2015/054591
§ 371 (c)(1),
(2) Date: Sep. 23, 2016

(87) PCT Pub. No.: WO2015/146388
PCT Pub. Date: Oct. 1, 2015

(65) Prior Publication Data
US 2017/0106767 A1  Apr. 20, 2017

(30) Foreign Application Priority Data
Mar. 25, 2014  (JP) .................. 2014-062000

(51) Int. Cl.
*B60M 1/36* (2006.01)
*B60L 5/36* (2006.01)
(Continued)

(52) U.S. Cl.
CPC ............. *B60M 1/36* (2013.01); *B60L 5/36* (2013.01); *B60L 5/40* (2013.01); *B60L 5/42* (2013.01); *B60M 1/30* (2013.01)

(58) Field of Classification Search
CPC . B60M 1/00; B60M 1/02; B60M 1/04; B60M 1/12; B60M 1/13; B60M 1/30;
(Continued)

(56) References Cited

U.S. PATENT DOCUMENTS 6,230,861 B1    5/2001  Cornic
6,382,378 B1 *  5/2002  Cornic .................... B60M 1/10
                                                    191/14
(Continued)

FOREIGN PATENT DOCUMENTS

CN      1781758 A      6/2006
DE   23 30 255 A1      1/1975
(Continued)

OTHER PUBLICATIONS

Anonymous: "Pre-charge—Wikipeida", Sep. 6, 2013. (4 pages).
(Continued)

*Primary Examiner* — Robert J McCarry, Jr.
(74) *Attorney, Agent, or Firm* — Westerman, Hattori, Daniels & Adrian, LLP

(57) ABSTRACT

Provided are an external power supply apparatus and a vehicle power supply method, whereby a power reception circuit of an electric vehicle can be projected or a configuration of the electric vehicle can be simplified. An external power supply apparatus is provided with: a power supply unit, which is provided along a traveling path, and which supplies power to a power reception unit of an electric vehicle while the vehicle is traveling; and a voltage applying unit that applies a voltage to the power supply unit. The power supply unit includes a plurality of divided power supply units that are divided along the traveling path. The voltage applying unit applies the voltage such that the
(Continued)

voltage to be applied to the divided power supply units becomes higher in the traveling direction of the electric vehicle.

9 Claims, 9 Drawing Sheets

(51) Int. Cl.
*B60M 1/30* (2006.01)
*B60L 5/40* (2006.01)
*B60L 5/42* (2006.01)

(58) Field of Classification Search
CPC . B60M 1/34; B60M 1/36; B60M 3/00; B60M 3/02
See application file for complete search history.

(56) References Cited

U.S. PATENT DOCUMENTS

| | | |
|---|---|---|
| 2006/0097116 A1 | 5/2006 | Fischperer |
| 2013/0057204 A1 | 3/2013 | Vollenwyder et al. |
| 2013/0092492 A1 | 4/2013 | Andre et al. |

FOREIGN PATENT DOCUMENTS

| | | |
|---|---|---|
| DE | 195 46 495 A1 | 6/1997 |
| DE | 10 2010 029 450 A1 | 12/2011 |
| EP | 2 284 635 A1 | 2/2011 |
| JP | 2000-118270 A | 4/2000 |
| JP | 2001-163088 A | 6/2001 |
| JP | 2005-86876 A | 3/2005 |
| JP | 2006-246568 A | 9/2006 |
| JP | 2008-148531 A | 6/2008 |
| JP | 2008-161055 A | 7/2008 |
| JP | 2013-515639 A | 5/2013 |
| JP | 2013-524755 A | 6/2013 |
| JP | 2013-208008 A | 10/2013 |
| JP | 2013-233037 A | 11/2013 |

OTHER PUBLICATIONS

Extended (supplementary) European Search Report dated Oct. 19, 2017, issued in counterpart European Application No. 15767714.7. (11 pages).
Office Action dated Aug. 1, 2017, issued in counterpart Chinese Application No. 201580015636.6, with English translation. (8 pages).
International Search Report dated Apr. 28, 2015, issued in counterpart International Application No. PCT/JP2015/054591 (1 page).

* cited by examiner

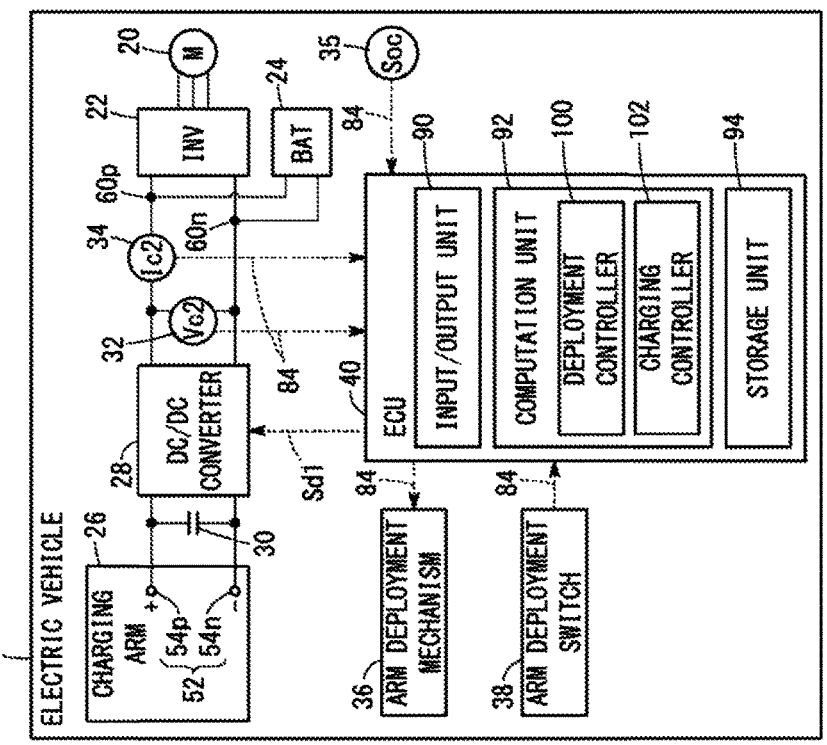
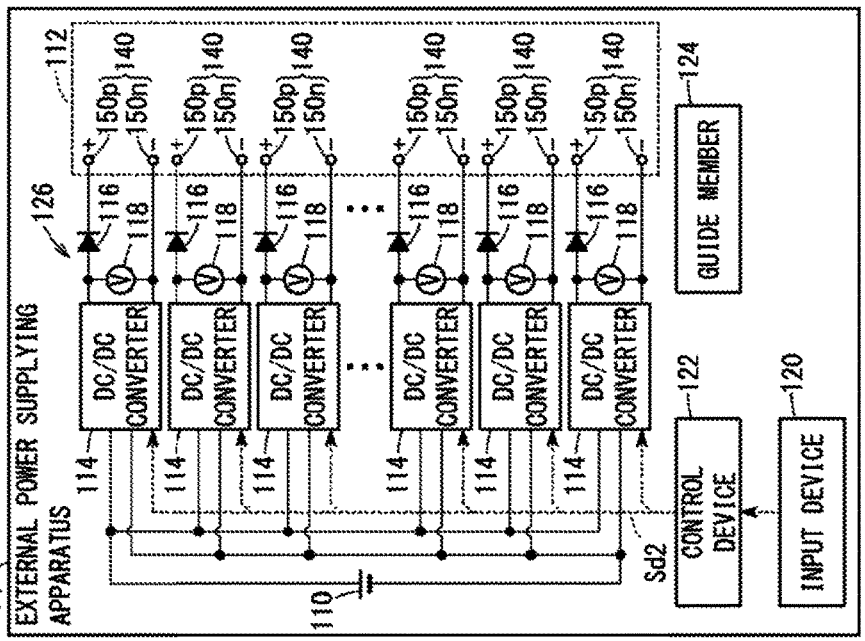
FIG. 1

EXTERNAL POWER SUPPLY APPARATUS AND VEHICLE POWER SUPPLY METHOD

TECHNICAL FIELD

The present invention relates to an external power supplying apparatus and a vehicle power supplying method for supplying electrical power to a vehicle during traveling.

BACKGROUND ART

As disclosed in Japanese Laid-Open Patent Publication No. 2013-233037 (hereinafter referred to as JP 2013-233037A), during traveling of an electric vehicle 10, a charging arm 18 is extended out in a vehicle transverse direction, and charging from a power supplying apparatus 26 is carried out by bringing the charging arm 18 into contact with power lines 24 made up from a positive electric power line 24p and a negative electrode power line 24n (see Abstract). A direct current or an alternating current high voltage is applied to the power lines 24 from a non-illustrated external power source (paragraph [0023]).

SUMMARY OF INVENTION

As noted above, according to JP 2013-233037A, a direct current or an alternating current high voltage is applied to the power lines 24 from the non-illustrated external power source (paragraph [0023]). In JP 2013-233037A, no detailed studies are disclosed in relation to the aforementioned high voltage.

The supplied voltage, which is supplied from the external power source to the power lines 24, is presumed to be a final target charging voltage. In the event that the charging arm 18 (power receiving device) is placed in contact with respect to the power lines 24 (electrical power lines) to which the final target charging voltage is applied, a voltage difference between the power lines 24 and the charging arm 18 becomes relatively large. In this case, it is likely for an inrush current (pulse current) to be generated, with the concern that damage may occur to the power reception circuitry of the electric vehicle 10. Further, if a circuit component for the purpose of avoiding generation of the aforementioned inrush current is provided in the power reception circuitry, the configuration of the power reception circuitry becomes complex.

Such a problem occurs not only in the case of a contact-type power supplying method, but also occurs in the case of a contactless power supplying (wireless power supplying) method.

The present invention has been devised taking into consideration the aforementioned problems, and has the object of providing an external power supplying apparatus and a vehicle power supplying method, which are capable of protecting or simplifying the structure of the power reception circuitry in an electric vehicle.

An external power supplying apparatus according to the present invention comprises a power supplying device disposed along a travel path and configured to supply electrical power to a power receiving device of an electric vehicle during traveling, a voltage applying unit configured to apply a voltage to the power supplying device, wherein the power supplying device includes a plurality of divided power supplying units divided along the travel path, and the voltage applying unit is configured to apply the voltage to the divided power supplying units, the voltage becoming higher along a direction of travel of the electric vehicle.

In the event that the power receiving device of the electric vehicle is placed in contact or brought into proximity with respect to the power supplying device to which a final target charging voltage is applied, a voltage difference between the external power lines and the power receiving device becomes relatively large. In this case, it is likely for an inrush current (pulse current) to be generated, with the concern that damage may occur to the power reception circuitry of the electric vehicle. Further, if a circuit component for the purpose of avoiding generation of the aforementioned inrush current is provided in the power reception circuitry, the configuration of the power reception circuitry becomes complex.

According to the present invention, a predetermined voltage, which is applied to the plurality of divided power supplying units disposed along the travel path, is set to become higher along the direction of travel. Therefore, when charging is started or during charging, the voltage difference between the power supplying units and the power receiving device can be made small. Accordingly, it is possible to protect or simplify the structure of the power reception circuitry in an electric vehicle.

The power supplying device may be equipped with power lines disposed along the travel path and configured to come into contact with the power receiving device of the electric vehicle during traveling, and the power lines may include a plurality of divided power lines divided along the travel path.

The power supplying device may further include a plurality of first divided power supplying units disposed on a near side in the direction of travel, output voltages thereof becoming higher along the direction of travel, and at least one second divided power supplying unit disposed on a far side in the direction of travel, an output voltage thereof being constant.

According to the above, in the case that the output voltage of the second divided power supplying unit is matched with a final target charging voltage, the output voltage along the travel path can be increased until the output voltage from the power supplying device reaches the final target charging voltage. In addition, after the output voltage from the power supplying device has arrived at the final target charging voltage, the output voltage can be maintained constant at a value equal to the final target charging voltage. Consequently, supply of power to the electric vehicle from the external power supplying apparatus can effectively be carried out.

The power lines may be arranged in facing relation to a side part of the electric vehicle, and on a near side of the power lines in the direction of travel, a guide member may be provided, which is isolated electrically from the voltage applying unit, and is configured to guide the power receiving device of the electric vehicle toward the power lines.

According to the above, the power receiving device of the electric vehicle comes into contact with the power lines after being guided by the guide member. Owing thereto, in comparison with a case in which the power receiving device contacts the power lines without the guide member, the behavior of the power receiving device at the time that contact with the power lines is started is easily stabilized. Therefore, a steep voltage fluctuation accompanying separation of the power receiving device from the power lines and recontact therewith after initial contact with the power lines is started can be suppressed. Consequently, supply of power to the electric vehicle from the external power supplying apparatus can stably be carried out.

The guide member may be bent so that a facing distance in the vehicle transverse direction between the guide member and a side cart of the electric vehicle narrows along the direction of travel. Owing thereto, a pressing force from the power receiving device to the guide member is easily increased as the electric vehicle progresses. For this reason, when the power receiving device contacts the power lines, it is possible to adjust the pressing force on the power lines from the power receiving device so as to be comparatively high. Consequently, the behavior of the power receiving device at the time that contact with the power lines is started is easily stabilized.

The voltage applying unit may further comprise a DC power source, a plurality of transformers arranged between the DC power source and the plurality of divided power lines, voltage sensors configured to detect output voltages of the plurality of transformers, and a transformer control device configured to control transformer ratios of the plurality of transformers based on detection values of the voltage sensors, wherein the transformer control device is configured to control the transformer ratios by setting as fixed values target output voltages of the respective transformers.

Owing thereto, the voltages applied to the respective divided power lines can be held consent. Therefore, it is possible to simplify the control in the case that power is supplied in succession with respect to a plurality of electric vehicles, and supply of power in a stable fashion is facilitated.

A vehicle power supplying method according to the present invention is characterized by supplying electrical power from a power supplying device of an external power supplying apparatus disposed along a travel path to an electric vehicle during traveling, comprising the steps of constituting the power supplying device from a plurality of divided power supplying units divided along the travel path, and increasing a voltage applied to the divided power supplying units along a direction of travel of the electric vehicle.

BRIEF DESCRIPTION OF DRAWINGS

FIG. 1 is an outline schematic view of a charging system including an external power supplying apparatus according to an embodiment of the present invention;

DESCRIPTION OF EMBODIMENTS

I. Embodiment

1A. Configuration
[1A-1. Overall Configuration]

Figure 2:
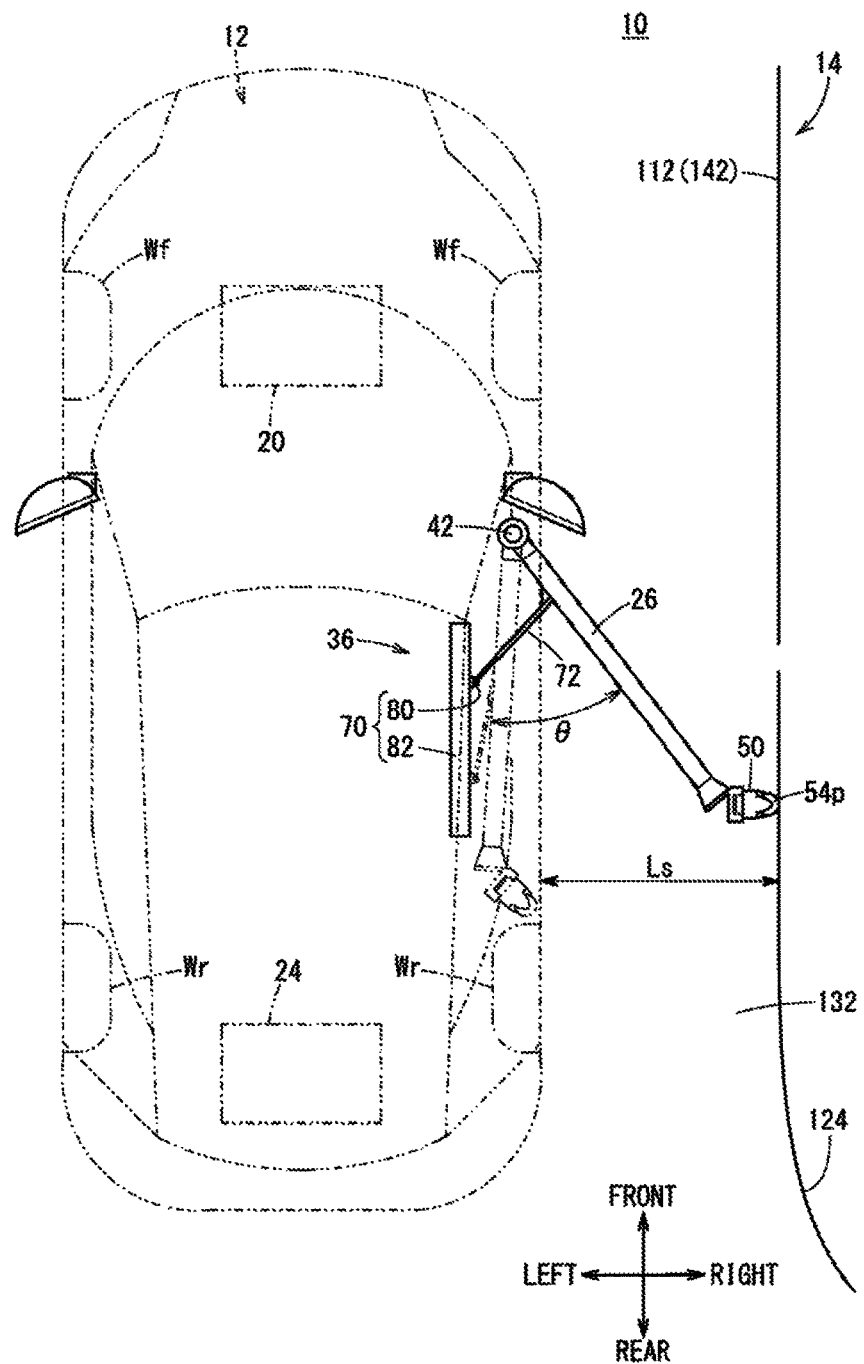
FIG. 2 is a plan view showing with emphasis portions of the charging system.
Figure 3:
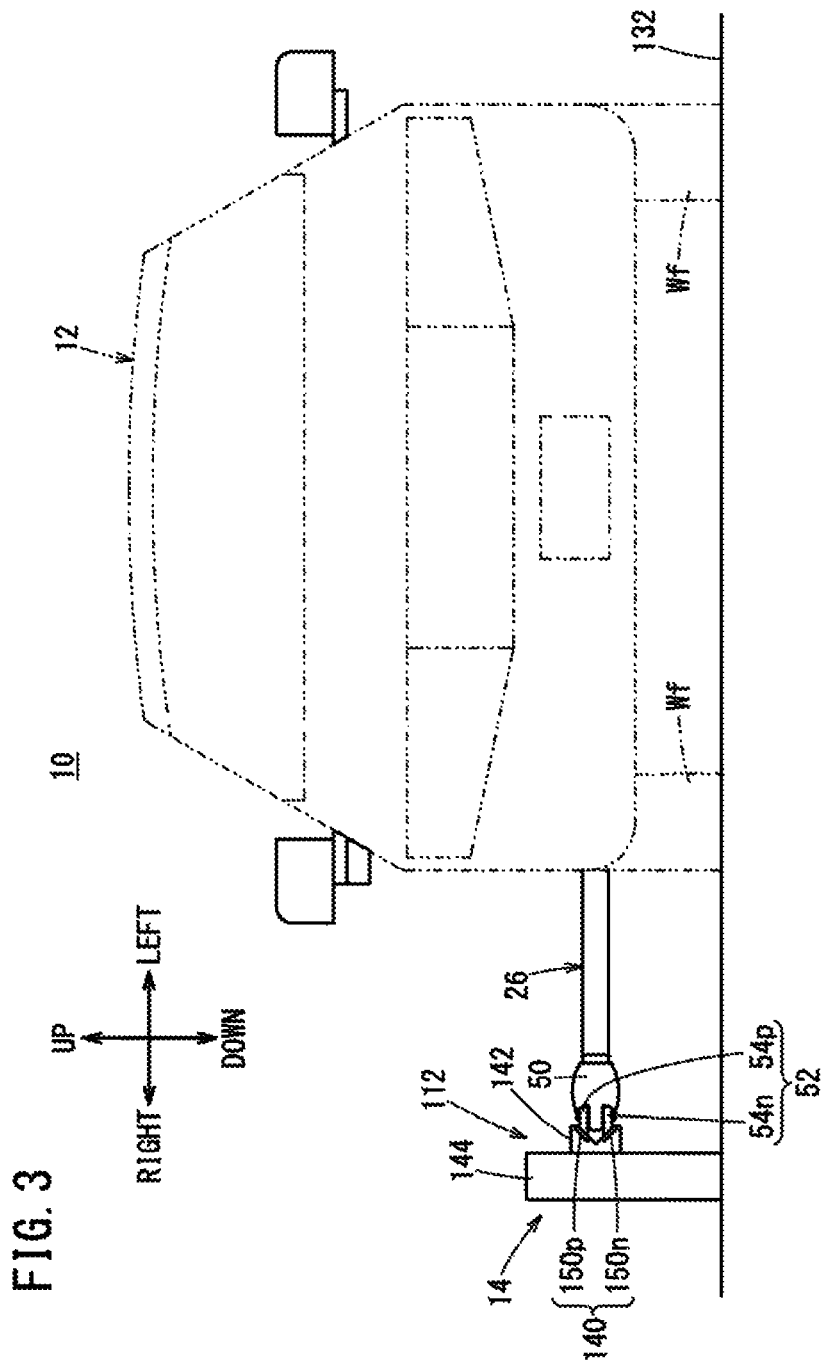
FIG. 3 is a front view showing with emphasis portions of the charging system.

FIG. 1 is an outline schematic view of a charging system 10 including an external power supplying apparatus 14 according to an embodiment of the present invention. FIG. 2 is a plan view showing with emphasis portions of the charging system 10. FIG. 3 is a front view showing with emphasis portions of the charging system 10. As shown in FIGS. 1 through 3, the charging system 10, in addition to the external power supplying apparatus 14 (hereinafter also referred to as a "power supplying apparatus 14"), includes an electric vehicle 12 (hereinafter also referred to as a "vehicle 12"). Any of the directions ("front", "rear", "left", "right", "up", "down") in FIGS. 2 and 3 are directions on the basis of the vehicle 12 (the same holds true for FIGS. 4 and 5).

According to the present embodiment, electrical power is supplied to the vehicle 12 from the power supplying apparatus 14, and charging of a battery 24 (see FIG. 1) for traveling of the vehicle 12 is performed. Conversely, electrical power may be supplied from the vehicle 12 to an external device (power supplying apparatus 14, etc.).

[1A-2. Electric Vehicle 12]
(1A-2-1. Overall Configuration of Electric Vehicle 12)

As shown in FIGS. 1 through 3, the vehicle 12 includes a traction motor 20 (hereinafter also referred to as a "motor 20"), an inverter 22, the battery 24 for traveling (hereinafter also referred to as the "battery 24"), a charging arm 26, a DC/DC converter 28, a capacitor 30, a voltage sensor 32, a current sensor 34, an SOC sensor 35, an arm deployment mechanism 36 (hereinafter also referred to as a "deployment mechanism 36"), an arm deployment switch 38, and an electronic control unit 40 (hereinafter referred to as an "ECU 40").

(1A-2-2. Traction Motor 20)

The traction motor 20 is a 3-phase brushless type of motor, which generates a drive force F [N] (or a torque [N·m]) for the vehicle 12 on the basis of electrical power supplied from the battery 24 through the inverter 22. Further, the motor 20 carries out charging of the battery 24 by outputting to the battery 24 a power (regenerative power Preg) [W] produced by performing a regenerative operation. The regenerative power Preg may also be output to a step-down converter, a low-voltage battery, and auxiliary devices, none of which are shown.

(1A-2-3. Inverter 22)

The inverter 22 is constituted as a 3-phase full-bridge type, which converts a DC current from the battery 24 into a 3-phase AC current and supplies the same to the motor 20, whereas accompanying a regenerative operation, supplies a DC current to the battery 24 or the like following AC/DC conversion.

(1A-2-4. Battery 24)

The battery 24 is an energy storage device (energy storage) including a plurality of battery cells, and for example, a lithium ion secondary battery, a nickel-metal hydride battery, or the like, can be used therefor. Alternatively, in place of the battery 24 or in addition to the battery 24, an energy storage device such as a capacitor or the like can be used. A non-illustrated DC/DC converter may be disposed between the inverter 22 and the battery 24, and an output voltage from the battery 24 or an output voltage from the motor 20 may be stepped-up or stepped-down in voltage.

(1A-2-5. Charging Arm 26)

The charging arm 26 (hereinafter also referred to as an "arm 26") is a site that is placed in contact with the power supplying apparatus 14 when the battery 24 is charged with electrical power from the power supplying apparatus 14. As shown in FIG. 2, the charging arms 26 is connected to a frame (not shown) of the vehicle 12 at a location between the front wheels Wf and the rear wheels Wr, with one end thereof being capable of rotating about an axis of rotation 42. Therefore, the charging arm 26 is capable of being deployed (or displaced) transversely of the vehicle 12 (on the right side in the present embodiment) at a time of contact with the power supplying apparatus 14.

A charging head 50 including a power receiving device 52 is provided on a distal end of the charging arm 26. The power receiving device 52 includes a positive electrode terminal 54$p$ and a negative electrode terminal 54$n$. The vehicle 12 and the power supplying apparatus 14 are connected electrically by the power receiving device 52 being placed in contact with divided power supplying units 140 of the power supplying apparatus 14.

Concerning the principal structure or the charging arm 26, for example, the structure disclosed in JP 2013-233037A can be used.

(1A-2-6. DC/DC Converter 28)

The DC/DC converter 28 (hereinafter also referred to as a "converter 28" or a "Vehicle side converter 28") transforms an output voltage of the power supplying apparatus 14 (hereinafter referred to as an "output voltage Vs" or a "power supply voltage Vs") and outputs the same to the inverter 22 and the battery 24. According to the present embodiment, the converter 28 steps-down the power supply voltage Vs, and outputs the same to the side of the vehicle 12. However, the converter 28 may carry out only stepping-up of the power supply voltage Vs, or may carry out both stepping-up and stepping-down in voltage thereof. A non-illustrated contactor preferably is disposed between the arm 26 and the converter 28.

(1A-2-7. Capacitor 30)

The capacitor 30 is arranged between the power receiving device 52 of the arm 26 and the converter 28. The capacitor 30, for example, suppresses voltage fluctuations by temporarily storing the electric power from the power supplying apparatus 14.

(1A-2-8. Voltage Sensor 32, Current Sensor 34, and SOC Sensor 35)

The voltage sensor 32 is arranged between the DC/DC converter 28 and branch points 60$p$, 60$n$, and detects a voltage (hereinafter referred to as a "converter output voltage Vc2", "a converter secondary voltage Vc2", or a "secondary voltage Vc2") on a secondary side (output side) of the DC/DC converter 28.

The current sensor 34 is arranged between the DC/DC converter 28 and the branch point 60$p$, and detects a current (hereinafter referred to as a "converter output current Ic2", "a converter secondary current Ic2", or a "secondary current Ic2") on the secondary side of the DC/DC converter 28. The SOC sensor 35 detects a remaining capacity (SOC: State of Charge) of the battery 24 and outputs the same to the ECU 40.

(1A-2-9. Arm Deployment Mechanism 36 and Arm Deployment Switch 38)

The arm deployment mechanism 36 serves to deploy the arm 26, and as shown in FIG. 2, includes a slider unit 70 and a damper unit 72. The slider unit 70 includes a slider 80 and a slider support member 82. Based on a command from the ECU 40, the slider 80 is capable of sliding with respect to the slider support member 82. The slider 80, for example, is an electromagnetic or a pneumatic type of linear actuator.

One end (first end) of the damper unit 72 is connected rotatably to the slider 80, and another end (second end) thereof is connected rotatably to the arm 26. When the arm 26 is deployed, the slider 80 is displaced to the front side of the vehicle 12, and the first end of the damper unit 72 is displaced forward. When the arm 26 is housed, the slider 80 is displaced to the rear side of the vehicle 12, and the first end of the damper unit 72 is displaced rearward.

The arm deployment switch 38 (hereinafter also referred to as a "deployment switch 38" or a "switch 38") serves to issue a command for deployment of the arm 26 in accordance with an operation from the user. The switch 38 for example, is formed on a portion of the steering wheel (not shown). When the switch 38 is turned, on, the arm 26 is deployed through the deployment mechanism 36, and when the switch 38 is turned off, the arm 26 is accommodated through the deployment mechanism 36.

(1A-2-10. ECU 40)

The ECU 40 serves to control reception of inputs from respective components of the vehicle 12 or to control the respective components themselves through a vehicle side communications line 84 (see FIG. 1), and includes an input/output unit 90, a computation unit 92, and a storage unit 94. In the present embodiment, the computation unit 92 of the ECU 40 includes a deployment controller 100 for controlling the arm deployment mechanism 36, and a charging controller 102 for controlling charging of the battery 24.

[1A-3. External Power Supplying Apparatus 14]

Figure 4:
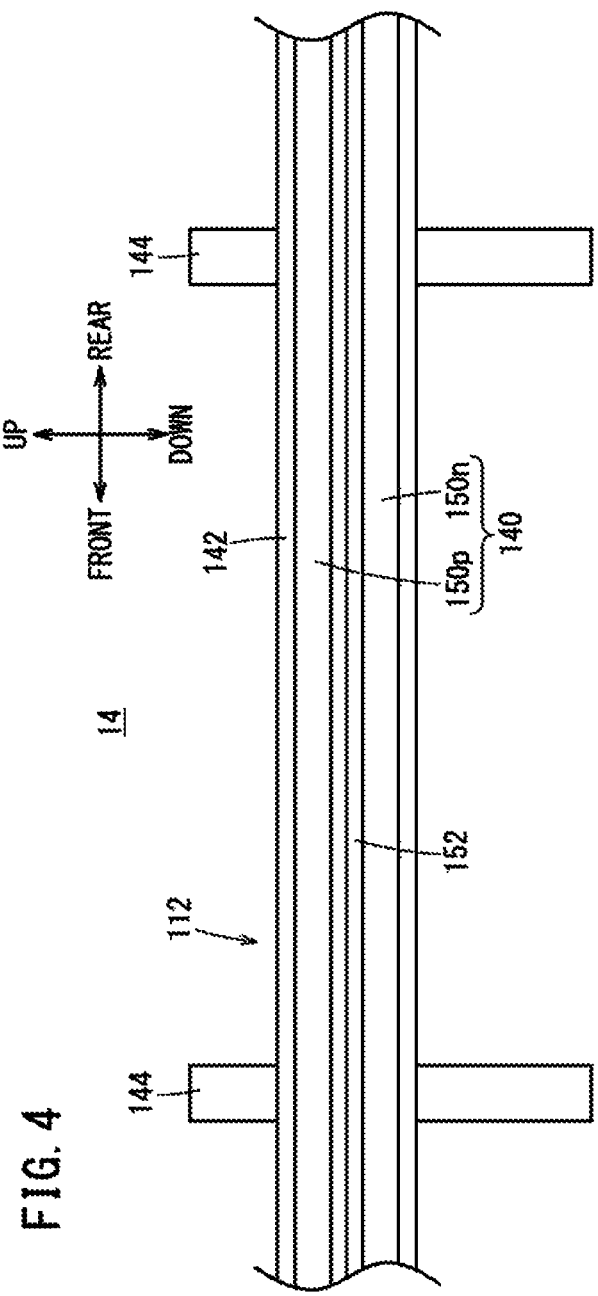
FIG. 4 is an external view showing schematically a portion of the external power supplying apparatus.

FIG. 4 is an external view showing schematically a portion of the external power supplying apparatus 14. As shown in FIGS. 1 through 4, the power supplying apparatus 14 includes a DC power source 110, a contact-type power supplying device 112, a plurality of DC/DC converters 114 (hereinafter also referred to as "converters 114" or "external converters 114"), diodes 116, voltage sensors 118, an input device 120, a control device 122, and a guide member 124. Hereinafter, the DC power source 110, the converters 114, the diodes 116, the voltage sensors 118, the input device 120, and the control device 122 may also be referred to collectively as a voltage applying unit 126. The voltage applying unit 126 is a site that applies a voltage with respect to the contact-type power supplying device 112.

(1A-3-1. DC Power Source 110)

The DC power source 110 (hereinafter also referred to as a "power source 110") supplies electrical power with respect to the vehicle 12. The power source 110 of the present embodiment is constituted, for example, by connecting a plurality of batteries together in series. Alternatively, the power source 110 may be constituted from a single battery. Alternatively, a plurality of power sources 110 may be provided respectively for each of the DC/DC converters 114 (or for each of respective divided power supplying units 140, to be described later). Alternatively, the power source 110 can be constituted from a combination of a commercial AC power source and an AC/DC converter (not shown).

(1A-3-2. Contact-Type Power Supplying Device 112)

(1A-3-2-1. Overall Configuration of Contact-Type Power Supplying Device 112)

The contact-type power supplying device 112 (hereinafter also referred to as a "power supplying device 112") is a site (a power line or a power supply line), which by being placed in contact with the arm 26 of the vehicle 12, supplies electrical power from the power source 110 to the side of the vehicle 12. With the contact-type power supplying device 112 of the present embodiment, the power supply voltage Vs increases along a travel path 132 of the vehicle 12 (or stated otherwise, along the direction of travel of the vehicle 12). Consequently, it is possible to prevent the flow of an excessive current, (inrush current) instantaneously in the vehicle 12.

Figure 5:
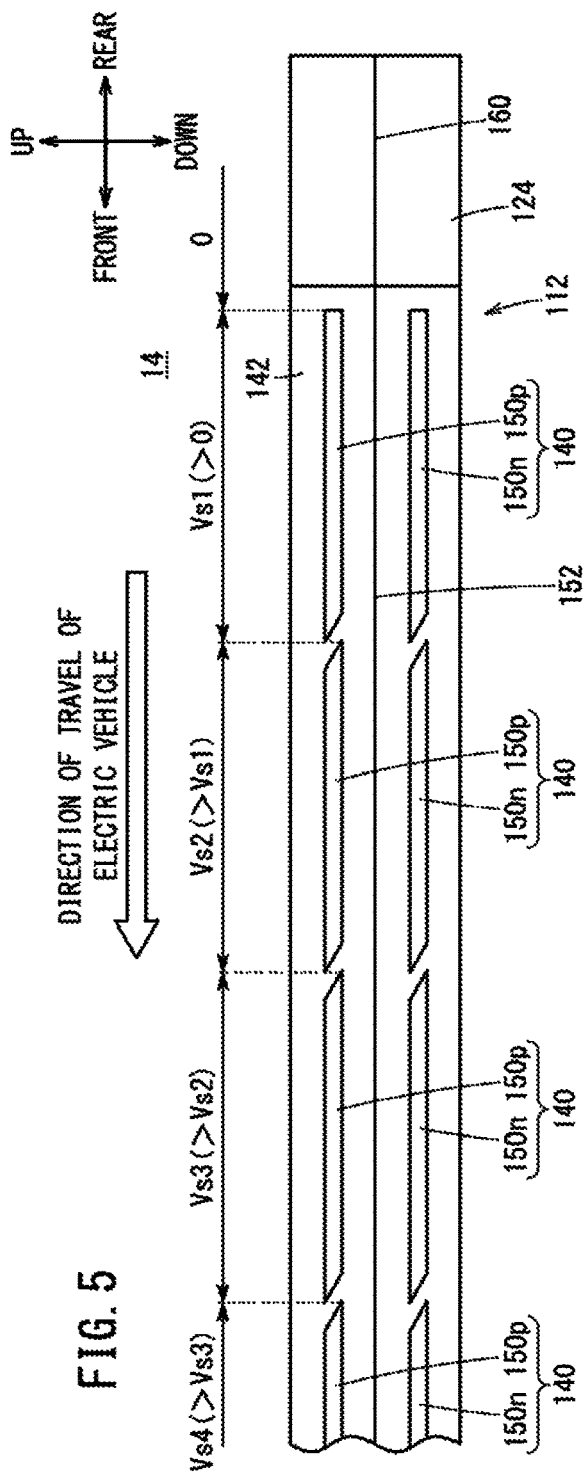
FIG. 5 is a view showing an aspect of increasing a power supply voltage in a contact-type power supplying device of the external power supplying apparatus along a travel path (or along a direction of travel of an electric vehicle)

FIG. 5 is a view showing an aspect of increasing a power supply voltage Vs in the contact-type power supplying device 112 along the travel path 132 (or along the direction of travel of the electric vehicle 12). As shown in FIGS. 1 through 5, the contact-type power supplying device 112 of the present embodiment includes a plurality of divided power supplying units 140, a plurality of terminal retaining sections 142, and a plurality of support posts 144.

(1A-3-2-2. Divided Power Supplying Units 140)

The respective divided power supplying units 140 each comprises a positive electrode terminal 150p and a negative electrode terminal 150n. As shown in FIGS. 3 to 5, pairs of positive electrode terminals 150p and negative electrode terminals 150n are formed in the interior of a groove member 152 that is formed in the terminal retaining section 142. Therefore, the respective divided power supplying units 140 are constituted as power lines that are disposed above the travel path 132.

Further, as shown in FIGS. 2 and 5, the positive electrode terminals 150p and the negative electrode terminals 150n are arranged along the travel path 132 of the vehicle 12. In particular, the positive electrode terminals 150p and the negative electrode terminals 150n of the present invention are disposed in the form of a straight line. The length of the respective positive electrode terminals 150p and the negative electrode terminals 150n in the direction of travel of the vehicle 12 can be set to any value, for example, within a range of 0.1 to 20 m. Further, according to the present embodiment, the lengths of each combination of a positive electrode terminal 150p and a negative electrode terminal 150n may be equivalent to each other, or such lengths may differ from each other mutually.

As shown in FIG. 5, adjacent positive electrode terminals 150p are electrically insulated by being mutually spaced apart. Similarly, adjacent negative electrode terminals 150n are electrically insulated by being mutually spaced apart.

However, according to the present embodiment, when the charging head 50 comes between adjacent divided power supplying units 140, the charging head 50 contacts both of the adjacent divided power supplying units 140. Stated otherwise, the distance between adjacent ones of the divided power supplying units 140 is set so that, at the time of contact of the charging head 50, a short circuit occurs between the adjacent divided power supplying units 140. Even in the case that the area between adjacent ones of the divided power supplying units 140 is short circuited, because of the presence of the diodes 116, flowing of current from a divided power supplying unit 140 of a high power supply voltage Vs to a divided power supplying unit 140 of a low power supply voltage Vs is prevented. Alternatively, a configuration may be provided such that, when the charging head 50 comes between adjacent divided power supplying units 140, the charging head 50 contacts only one of the adjacent divided power supplying units 140.

In addition, when viewed in the vehicle transverse direction, an end of the positive electrode terminal 150p is formed in a tapered shape so as to overlap in the vertical direction with an end of the adjacent positive electrode terminal 150p. More specifically, as shown in FIG. 5, at ends on the right side of each of the positive electrode terminals 150p (ends on the near side in the direction of travel), upper sites thereof become reduced toward the tip end. Further, as shown in FIG. 5, at ends on the left side of each of the positive electrode terminals 150p (ends on the far side in the direction of travel), lower sites thereof become reduced toward the tip end. Consequently, the heights of each of the positive electrode terminals 150p can be maintained, while end portions of adjacent positive electrode terminals 150p can overlap in the vertical direction. A reverse construction thereof is also possible.

(1A-3-2-3. Terminal Retaining Section 142)

As discussed above, respective divided power supplying units 140 are retained in the groove member 152 of the terminal retaining section 142. According to the present embodiment, plural terminal retaining sections 142 are provided corresponding to the respective divided power supplying units 140. However, from the standpoint of retaining the respective divided power supplying units 140, it is possible to provide a single terminal retaining section 142 corresponding to a combination of plural divided power supplying units 140. Alternatively, all of the divided power supplying units 140 may be formed in a single terminal retaining section 142.

(1A-3-3. Support Posts 144)

The support posts 144 are disposed vertically on the side of the travel path 132, and support the divided power supplying units 140 and the terminal retaining sections 142.

(1A-3-3. External Converters 114)

The respective converters 114 transform the input voltage (power source voltage Vcc) from the power source 110, and output the same to the divided power supplying units 140. Each of the converters 114 is a step-up/step-down type converter. Alternatively, depending on the power source voltage Vcc, each of the converters 114 can be a step-up or a step-down type of converter. Alternatively, the specifications of the converters 114 may differ mutually from each other, such as by having a portion of the plural converters 114 be step-up type converters, whereas the remaining ones may be step-down type converters, or the like. As will be discussed later, a configuration also is possible in which the converters 114 are not provided.

As shown in FIG. 5, according to the present embodiment, until the power supply voltage Vs arrives at a target value, the power supply voltage Vs increases in a stepwise manner along the direction of travel. The transformer ratios of the converters 114 are controlled by the control device 122. More specifically, the duty ratios of drive signals Sd2 with respect to each of the converters 114 (see FIG. 1) are adjusted, whereby the power supply voltages Vs are controlled by transforming the power source voltage Vcc. The power source voltage Vcc according to the present embodiment is a comparatively high voltage, and the converters 114 produce the power supply voltages Vs by stepping-down the power source voltage Vcc. Alternatively, the converters 114 may carry out only stepping-up of the power source voltage Vcc, or may carry out both stepping-up and stepping-down in voltage thereof. After the power supply voltage Vs has reached the target value, the control device 122 maintains the power supply voltage Vs at a constant value.

(1A-3-4. Diodes 116)

The diodes 116 are arranged between the converters 114 and the positive electrode terminals 150p, and serve to prevent flowing of current from the vehicle 12 to the side of the power supplying apparatus 14.

(1A-3-5. Voltage Sensors 118)

The voltage sensors 118 are disposed on sides (output sides) of the DC/DC converters 114, detect the output voltages (power supply voltages Vs) of the converters 114, and output information thereof to the control device 122.

(1A-3-6. Input Device 120)

The input device 120 serves to input to the control device 122 commands from an administrator of the power supplying apparatus 14. The input device 120 can be constituted, for example, from a plurality of operation buttons, and in input means such as a keyboard or the like.

(1A-3-7. Control Device 122)

The control device 122 serves to control the power supplying apparatus 14 as a whole, and according to the present embodiment, primarily controls the external converters 114.

(1A-3-8. Guide Member 124)

As shown in FIGS. 2 and 5, the guide member 124 is disposed on a near side of the contact-type power supplying device 112 in the direction of travel. The guide member 124 is isolated electrically from the voltage applying unit 126, and guides the power receiving device 52 of the vehicle 12 toward the contact-type power supplying device 112. As shown in FIG. 5, the guide member 124 is connected to a terminal retaining section 142 at the near side of the terminal retaining section 142. A groove member 160, which joins with the groove member 152 of the terminal retaining section 142, is formed in the guide member 124. Owing thereto, the guide member 124 guides the power receiving device 52 of the vehicle 12 toward the contact-type power supplying device 112.

As shown in FIG. 1, the guide member 124 is not connected to the power source 110. Therefore, even though the power receiving device 52 of the arm 26 comes into contact with the guide member 124, electrical power is not supplied to the electric vehicle 12 from the power supplying apparatus 14.

As shown in FIG. 2, the guide member 124 is bent so that a facing distance Ls [m] in the vehicle transverse direction between the guide member 124 and a side part of the electric vehicle 12 narrows along the direction of travel.

1B. Various Types of Control

[1B-1. Overview]

Next, a description will be presented concerning controls (charging arm control and charging control) in the case that electrical power is supplied to the vehicle 12 from the power supplying apparatus 14, and charging of the battery 24 of the vehicle 12 is performed.

The charging arm control is a control for the charging arm 26 prior to charging, during charging, and after charging of the battery 24, which is implemented by the deployment controller 100 of the ECU 40. The charging control is a control for carrying out charging of the battery 24 of the vehicle 12. In the charging control, there are included a power supplying control implemented by the control device 122 of the power supplying apparatus 14, and a power receiving control implemented by the charging controller 102 of the ECU 40 of the vehicle 12.

[1B-2. Charging Arm Control]

The ECU 40 carries out the charging arm control in the following manner. More specifically, in the case that the charging am 26 is not deployed, the ECU 40 determines whether or not a deployment starting condition for the arm 26 has been satisfied. As such a deployment starting condition, there can be cited, for example, that the deployment switch 38 has been turned on.

In addition to or in place thereof, a distance (distance in the direction of travel) between the vehicle 12 and the contact-type power supplying device 112 or the guide member 124 in the direction of travel of the vehicle 12 may serve as a deployment starting condition. In order to determine the distance in the direction of travel, for example, there may provided beforehand in the vehicle 12 a non-illustrated present position detecting device (for example, a navigation device), and a map database in which position information of the power supplying apparatus 14 (contact-type power supplying device 112) is stored. In addition, the distance in the direction of travel can be calculated as a distance between the present position of the vehicle 12 and the position of the contact-type power supplying device 112.

Alternatively, it is possible to provide communications devices for short-range communications, respectively, in the vehicle 12 and the power supplying apparatus 14, and it can be judged that the deployment starting condition is satisfied when communications between both communications devices are established.

In the case that the deployment starting condition is satisfied, the ECU 40 implements a deployment process for deploying the arm 26, which is in an accommodated state. Accordingly, the angle of rotation θ of the arm 26 (see FIG. 2) is changed, and the arm 26 approaches toward the divided power supplying units 140 in a condition of projecting out maximally from the vehicle body of the vehicle 12.

In such a condition, the ECU 40 determines whether or not a deployment ending condition for the arm 26 has been satisfied. As such a deployment ending condition, there can be cited, for example, that the deployment switch 38 has been turned off.

In addition to or in place thereof, completion of charging of the battery 24 may be used as the deployment ending condition. Completion of charging can be determined by the SOC having reached a predetermined threshold (SOC threshold), or by the voltage of the battery 14 having reached a predetermined threshold (battery voltage threshold).

Alternatively, it is possible to provide communications devices for short-range communications, respectively, in the vehicle 12 and the power supplying apparatus 14, and after communications between both communications devices has been established, it can be judged that the deployment ending condition is satisfied when communications are cut off.

In the case that the deployment ending condition is satisfied, the ECU 40 implements an accommodating process for accommodating the arm 26.

[1B-3. Power Supplying Control of External Power Supplying Apparatus 14]

Figure 6:
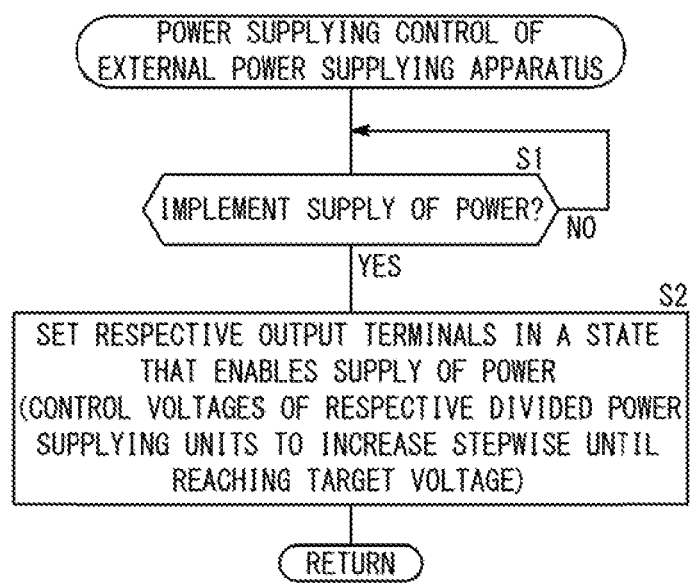
FIG. 6 is a flowchart of a power supplying control of the external power supplying apparatus according to the embodiment.

FIG. 6 is a flowchart of a power supplying control of the external power supplying apparatus 14 according to the present embodiment. In step S1, the control device 122 determines whether or not to carry out supply of power. Such a determination is made by determining whether a predetermined command from the administrator has been input through the input device 120, or whether or not such a command is valid.

In the case that supply of power is not implemented (step S1: NO), then step S1 is repeated. In the case that supply of power is to be implemented (step S1: YES), then in step S2, the control device 122 sets the respective divided power supplying units 140 in a state that enables supply of power. More specifically, the control device 122 outputs drive signals Sd2 intermittently or continuously to respective switching elements (not shown) of the external converters 114, thereby connecting the power source 110 and the divided power supplying units 140. Consequently, the respective divided power supplying units 140 are placed in a power supply enabling state. In addition, when the power receiving device 52 of the arm 26 comes into contact with any one of the divided power supplying units 140, supply of power from the power supplying apparatus 14 to the vehicle 12 is carried out through the power supplying units 140.

At this time, the control device 122 controls the step-up ratio of the converters 114 so that the output voltage (power supply voltage Vs) of the divided power supplying units 140 becomes greater in a stepwise manner. However, it should be noted that the power supply voltages Vs of each of the converters 114 are of fixed values (see FIG. 7).

Figure 7:
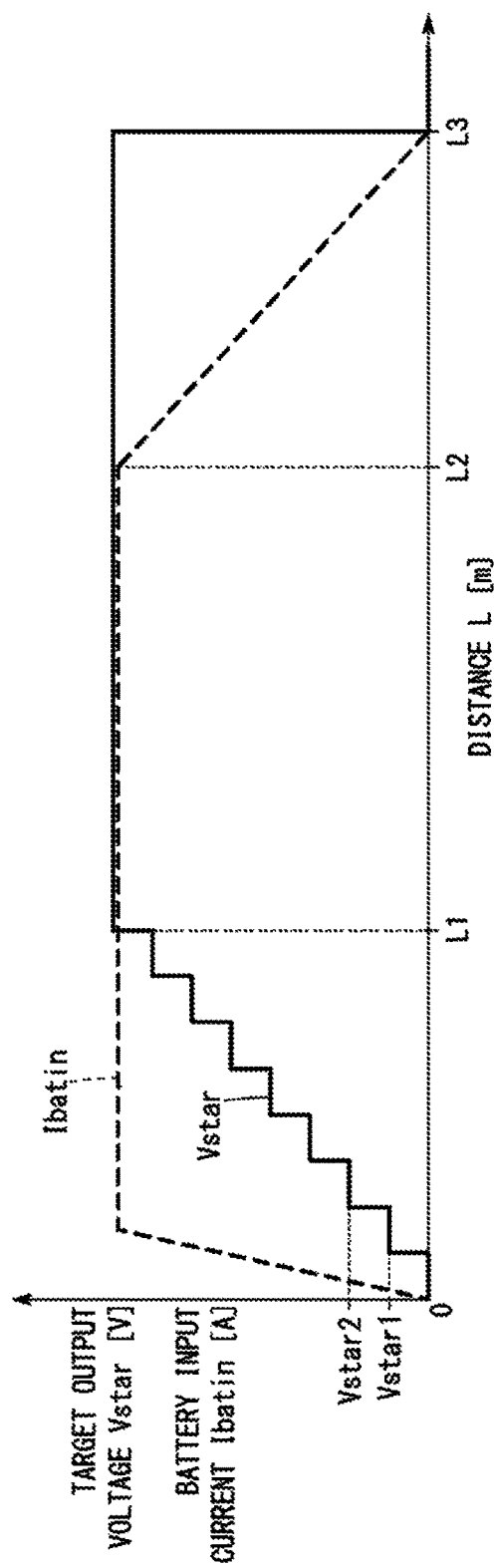
FIG. 7 is a view showing an example of a relationship between a distance from a starting point of a guide member, output voltage target values (target output voltages) of divided power supplying units, and an input current (battery input current) to a battery.

FIG. 7 is a view showing an example of a relationship between a distance L from a starting point Pst of the guide member 124, target values of the output voltages Vs (target output voltages Vstar) of the divided power supplying units 140, and an input current Ibatin to the battery 24 (hereinafter referred to as an "input current Ibatin"). The starting point Pst referred to above implies the nearest location of the guide member 124 in the direction of travel of the vehicle 12.

Stated otherwise, in FIG. 7, an example is shown of a case in which the power receiving device 52 of the arm 26 has come into contact with the guide member 124 from the nearest location of the guide member 124. Therefore, it should be noted that, in the event that the power receiving device 52 has come into contact from a midway location of the guide member 124 or from a portion of the divided power supplying units 140, the waveform occurs from the middle of the example of FIG. 7.

As shown in FIGS. 5 and 7, as the vehicle advances from the guide member 124 along the direction of travel, the target output voltages Vstar of the divided power supplying units 140 are set to become higher. Stated otherwise, at the divided power supplying units 140 of a range until the distance L becomes L1, respective target output voltages Vstar are set at fixed values so that the output voltage Vs increases stepwise. For example, when observed from the nearest side, the output voltage Vstar of the first divided power supplying unit 140 is Vstar1, and the output voltage Vstar of the second divided power supplying unit 140 is Vstar2. Consequently, entry of an inrush current into the converter 28 on the side of the vehicle is suppressed, and damage to the switching element of the converter 28 (not shown) or the battery 24 can be prevented.

At divided power supplying units 140 of a range after the distance L has become L1, the target output voltage Vstar is a fixed value so that the output voltage Vs remains constant.

The control device 122 carries out the process of FIG. 6 at each of predetermined periods (for example, an interval of 0.1 to 3 seconds).

Further, in FIG. 7, after the distance L has become L2, despite the fact that the target output voltage Vstar is held constant, the input current Ibatin decreases. Such a feature occurs as charging of the battery 24 progresses, and accompanying the difference between the voltage of the battery 24 and the output voltage Vs becoming smaller. When the distance L becomes L3, the arm 26 separates away from the contact-type power supplying device 112, and charging is brought to an end. In the example of FIG. 7, the input current Ibatin is lowered continuously from the time that the distance L2 is reached, and as a result, when the distance L3 is reached, the input current Ibatin becomes zero. More specifically, a case is shown in which the battery 24 acquires a fully charged state.

[1B-4. Power Receiving Control of the Vehicle 12]

Figure 8:
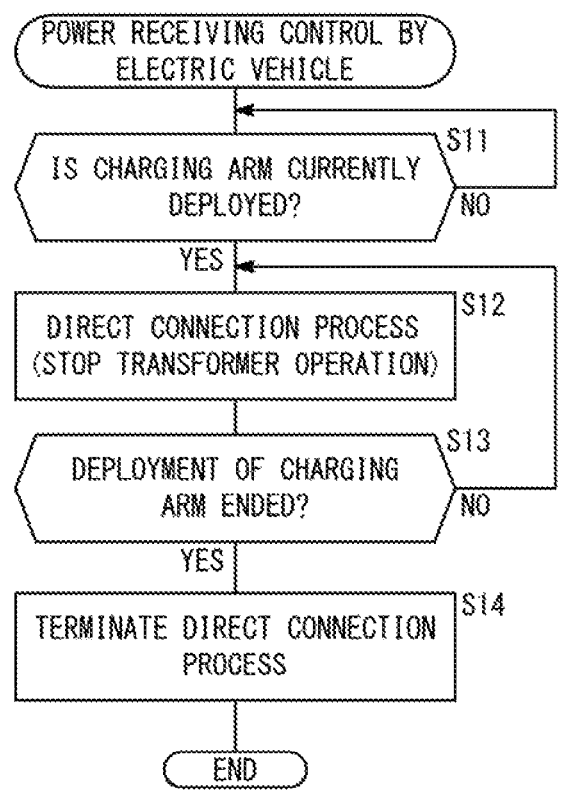
FIG. 8 is a flowchart of a power receiving control by the electric vehicle according to the embodiment.

FIG. 8 is a flowchart of a power receiving control by the electric vehicle 12 according to the present embodiment. In step S11, the ECU 40 determines whether or not the arm 26 is currently deployed. Such a determination is carried out, for example, based on whether or not a deployment starting condition of the charging arm control has been satisfied.

If the arm 26 is not currently deployed (step S11: NO), step S11 is repeated. If the arm 26 is currently deployed (step S11: YES), then in step S12, the ECU 40 stops the transforming operation by the converter 28, and implements a direct connection process for directly supplying electrical power from the power supplying apparatus 14 to the battery 24, etc. In this case, the ECU 40 continuously outputs (i.e., at a duty ratio of 100%) a drive signal Sd1 (see FIG. 1) with respect to the converter 28. Consequently, the battery 24 and the power receiving device 52 transition from a state of not being connected to a state of being connected electrically.

In step S13, the ECU 40 determines whether or not deployment of the arm 26 has ended. Such a determination is carried out, for example, based on whether or not a deployment ending condition in the charging arm control has been satisfied.

If deployment of the arm 26 has not ended (step S13: NO), then step S12 is returned to, and the direct connection process is continued. If deployment of the arm 26 has ended (step S13: YES), then in step S14, the ECU 40 terminates the direct connection process. Owing thereto, a non-connected state is brought about in which the battery 24 and the power receiving device are not connected electrically. Following step S14, step S11 is returned to after the elapse of a predetermined time period.

1C. Advantages of the Present Embodiment

As has been described above, according to the present embodiment, a predetermined voltage, which is applied to the plurality of divided power supplying units 140 (divided power lines) disposed along the travel path 132, is set to become higher along the direction of travel (see FIGS. 5 and 7). Therefore, when charging is started or during charging, the voltage difference between the power supplying device 112 (power lines) and the power receiving device 52 can be made small. Accordingly, it is possible to protect or simplify the structure of the power reception circuitry (the inverter 22, the battery 24, the DC/DC converter 28, the capacitor 30, the voltage sensor 32, and the current sensor 34, etc.) of the electric vehicle 12.

In the present embodiment, the power supplying device 112 (power lines) further includes the divided power supplying units 140 (first divided power lines) disposed on the near side in the direction of travel, for which the output voltages Vs thereof become higher along the direction of travel, and the divided power supplying unit 140 (second divided power lines) disposed on the far side in the direction of travel, and the output voltage Vs of which is constant (see FIG. 7).

According to the above, in the case that the output voltage Vs of the second divided power lines is matched with the final target output voltage Vstar, the output voltage Vs along the travel path 132 can be increased until the output voltage Vs from the power supplying device 112 (power lines) reaches the final target output voltage Vstar. In addition, after the output voltage Vs from the power supplying device 112 has arrived at the final target output voltage Vstar, the output voltage Vs can be maintained constant at a value equal to the final target output voltage Vstar. Consequently, supply of power to the electric vehicle 12 from the external power supplying apparatus 14 can effectively be carried out.

In the present embodiment, the power supplying device 112 (power lines) is arranged in facing relation to a side part of the electric vehicle 12 (see FIGS. 1 and 3). Further, on the near side of the power supplying device 112 in the direction of travel, the guide member 124 is isolated electrically from the voltage applying unit 126, and is disposed to guide the power receiving device 52 of the vehicle 12 toward the power supplying device 112 (see FIG. 2, etc.).

As discussed above, the power receiving device 52 of the electric vehicle 12 comes into contact with the power supplying device 112 after being guided by the guide member 124. Owing thereto, in comparison with a case in which the power receiving device 52 contacts the power supplying device 112 without the guide member 124, the behavior of the power receiving device 52 at the time that contact with the power supplying device 112 is started is easily stabilized. Therefore, a steep voltage fluctuation accompanying separation of the power receiving device 52 from the power supplying device 112 and recontact therewith after initial contact with the power supplying device 112 is started can be suppressed. Consequently, supply of power to the electric vehicle 12 from the external power supplying apparatus 14 can effectively be carried out.

In the present embodiment, the guide member 124 is bent so that a facing distance Ls in the vehicle transverse direction between the guide member 124 and a side part of the electric vehicle 22 narrows along the direction of travel (see FIG. 2). Owing thereto, a pressing force from the power receiving device 52 of the guide member 124 is easily increased as the electric vehicle 12 progresses. For this reason, when the power receiving device 52 contacts the power supplying device 112, it is possible to adjust the pressing force on the power supplying device 112 from the power receiving device 52 so as to be comparatively high. Consequently, the behavior of the power receiving device 52 at the time that contact with the power supplying device 112 is started is easily stabilized.

In the present embodiment, the voltage applying unit 126 further comprises the DC power source 110, the plurality of converters 114 arranged between the DC power source 110 and the plurality of divided power supplying units 140 (divided power lines), the voltage sensors 118 that detect output voltages Vs of the plurality of converters 114, and the control device 122 (transformer control device) that controls transformer ratios of the plurality of converters 114 based on detection values of the voltage sensors 118. The control device 122 controls the transformer ratios by setting as fixed values the target output voltages Vstar of the respective converters 114 (step S2 in FIG. 6).

Owing thereto, the voltages applied to the respective divided power supplying units 140 can be held constant. Therefore, it is possible to simplify the control in the case that power is supplied in succession with respect to a plurality of electric vehicles 12, and supply of power in a stable fashion is facilitated.

II. Modifications

The present invention is not limited to the above-described embodiment, and it goes without saying that various configurations could be adopted therein, based on the content disclosed in the present specification. For example, the following configurations can be adopted.
2A. Vehicle
[2A-1. Type of Vehicle 12]
According to the above-described embodiment, a vehicle 12 in the form of a four-wheeled vehicle has been described (see FIG. 2). However, for example, from the standpoint of having the power supply voltage Vs increase along the travel path 132, it is possible for the present invention to be applied to other vehicles apart from a four-wheeled vehicle. For example, the vehicle 12 can be any of a two-wheeled vehicle, a three-wheeled vehicle, and a six-wheeled vehicle. Alternatively, the present invention can be applied to mobile objects (e.g., ships) other than the vehicle 12.

According to the above-described embodiment, the vehicle 12 is assumed to be a so-called electric automobile (battery vehicle) having only the traction motor 20 as a drive source (see FIG. 1). However, for example, from the standpoint of having the power supply voltage Vs increase along the travel path 132, it is possible for the vehicle 12 to be a vehicle apart from an electric automobile. For example, the vehicle 12 may be a hybrid vehicle or a fuel cell vehicle.
[2A-2. Circuit Configuration]
According to the above-described embodiment, the electrical circuit configuration for the vehicle 12 is as shown in FIG. 1. However, for example, from the standpoint of having the power supply voltage Vs increase along the travel path 132, the invention is not limited to this feature. For example, it is possible for the converter 28 on the side of the vehicle to be eliminated.

Figure 9:
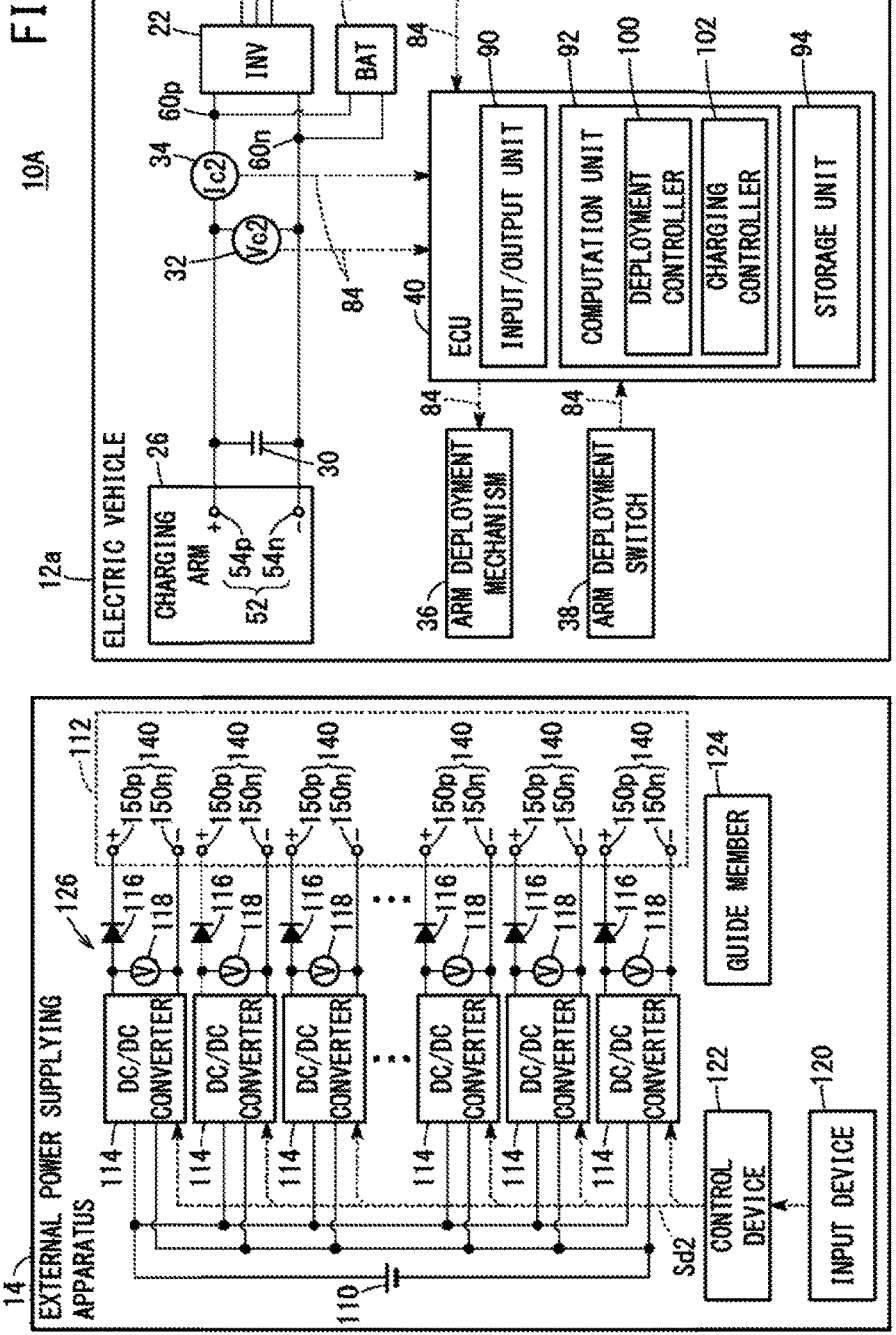
FIG. 9 is an outline schematic view of a charging system according to a modification.

FIG. 9 is an outline schematic view of a charging system 10A according to a modification. A vehicle 12a of the charging system 10A differs from that of the aforementioned embodiment, for example, in that the converter 28 is not included. The external power supplying apparatus 14 of the charging system 10A is the same as that of the embodiment described above. A non-illustrated contactor preferably is disposed between the branch points 60p, 60n and the power receiving device 52. In the foregoing manner, in the case that the converter 28 is eliminated, it becomes possible to eliminate entirely the control of FIG. 8, and the circuit configuration on the side of the vehicle 12 can further be simplified.
[2A-3. Charging Arm 26]
According to the above-described embodiment the arm 26 is provided (see FIGS. 2 and 3), which is capable of being deployed laterally of the vehicle 12. However, for example, from the standpoint of having the power supply voltage Vs increase along the travel path 132, the invention is not limited to this feature. For example, the arm 26 may be arranged so as to be capable of being deployed or displaced upwardly or downwardly of the vehicle 12. It should be noted, in the case that the arrangement of the arm 26 is changed, it becomes necessary for the arrangement of the divided power supplying units 140 of the power supplying apparatus 14 also to be changed.

According to the above-described embodiment, when the charging arm 26 comes into proximity and contacts the divided power supplying units 140, the arm 26 is rotated about the axis of rotation 42. However, for example, from the standpoint of enabling the charging arm 26 to approach toward and contact the divided power supplying units 140, the invention is not limited to this feature. For example, it is possible for a mechanism to be provided that displaces the arm 26 linearly, and which causes the arm 26 to approach and come into contact linearly with the divided power supplying units 140.
2B. External Power Supplying Apparatus 14
[2B-1. Power Supplying Device 112]
According to the above-described embodiment, the respective divided power supplying units 140 are disposed in a straight line shape (see FIG. 2). However, for example, from the standpoint of having the power supply voltage Vs of the power supplying apparatus 14 increase along the travel path 132, the divided power supplying units 140 may also be disposed along a curved road.

[2B-2. Guide Member 124]

The guide member 124 of the above-described embodiment is bent so that a facing distance Ls in the vehicle transverse direction between the guide member 124 and a side part of the electric vehicle 12 narrows along the direction of travel (see FIG. 2). However, for example, from the standpoint of guiding the power receiving device 52 along the power supplying device 112, the invention is not limited to this feature. For example, the guide member 124 may be formed in its entirety along the travel path 132. For example, in the case that the travel path 132 is a straight path, the guide member 124 as a whole can be formed in a straight line shape.

With the above-described embodiment, the guide member 124 is provided (see FIGS. 1, 2, and 5). However, for example, insofar as the power supply voltage Vs of the power supplying apparatus 14 is made to increase along the travel path 132, it is possible to eliminate the guide member 124.

[2B-3. Other Features]

In FIG. 7, an example is shown in which the power supply voltage Vs of the respective divided power supplying units 140 is made to increase in eight-step divisions not including 0 V. However, for example, from the standpoint of having the power supply voltage Vs increase along the travel path 132, the invention is not limited to this feature. For example, it is possible for the power supply voltage Vs to increase in any of two steps or greater, not including 0 V.

According to the above-described embodiment, the external converters 114 are controlled by the control device 122, whereby the power supply voltages Vs of the respective divided power supplying units 140 are controlled (step S2 in FIG. 6). However, for example, in the case that the power source 110 is constituted in the form of an aggregation of multiple DC power sources (e.g., batteries) connected together in series, it is possible to eliminate the converters 114 and the control device 122. In this case, by adjusting the connection points of the respective positive electrode terminals 150p with respect to the power source 110, the power supply voltages Vs can be made to increase along the travel path 132. Alternatively, it is possible for separate power sources 110 to be provided individually for each of the divided power supplying units 140.

2C. Power Supplying Control of the External Power Supplying Apparatus 14

With the power supplying control of the above embodiment, the target output voltages Vstar in the respective divided power supplying units 140 are of fixed values (see FIGS. 5 and 7). However, for example, insofar as the power supply voltage Vs of the power supplying apparatus 14 is made to increase along the travel path 132, the target output voltages Vstar of the respective divided power supplying units 140 may be variable.

In this case, the control device 122 specifies the divided power supplying unit 140 for which contact therewith of the power receiving device 32 of the charging arm 36 is started (hereinafter also referred to as a "start of contact divided power supplying unit 140st"). In addition, the control device 122 may control the step-up ratio of the converters 114 so that the output voltages Vs (or the target output voltages Vstar) increase in order from the start of contact divided power supplying unit 140st.

Moreover, concerning the specification of the start of contact divided power supplying unit 140st, for example, one or a plurality of cameras (not shown) may be arranged in the vicinity of the travel path 132, thus enabling the start of contact divided power supplying unit 140st to be determined on the basis of images acquired by such cameras. Alternatively, all of the target output voltages Vstar of the respective divided power supplying units 140 may be set to a minimum positive value, together with monitoring currents that flow through the divided power supplying units 140. In addition, the divided power supplying unit 140 through which current flows can be specified as the start of contact divided power supplying unit 140st.

2D. Power Receiving Control of Electric Vehicle 12

With the power receiving control according to the present embodiment, a direct connection process (step S12) is carried out. However, for example, from the standpoint of having the power supply voltage Vs of the power supplying apparatus 14 increase along the travel path 132, the invention is not limited to this feature. For example, it is possible for charging of the battery 24 to be carried out in the absence of the direct connection process (while the transforming operation by the converter 28 is performed).

2E. Other Features

According to the above-described embodiment, a configuration has been described in which only supply of electrical power to the vehicle 12 from the power supplying apparatus 14 is carried out. However, conversely, the present invention is capable of being applied to a configuration in which supply of power from the vehicle 12 to the power supplying apparatus 14 is carried out. In this case, along the travel path 132, power is supplied to the power supplying apparatus 14 by increasing by way of the converter 28 the output voltage of the battery 24.

According to the above-described embodiment, the present invention is applied to a case in which supply of power by direct current is performed with respect to the vehicle 12 from the power supplying apparatus 14. However, for example, insofar as the power supply voltage Vs of the power supplying apparatus 14 is made to increase along the travel path 132, it is possible for the present invention to be applied to a case in which supply of power by an alternating current is performed with respect to the vehicle 12 from the power supplying apparatus 14.

According to the above-described embodiment, the present invention is applied to a case in which contact-type supply of power is carried out between the vehicle 12 and the power supplying apparatus 14. However, for example, insofar as the power supply voltage Vs of the power supplying apparatus 14 is made to increase along the travel path 132, it is possible for the present invention to be applied to a case in which non-contact supply of power (wireless power supply) is carried out between the vehicle 12 and the power supplying apparatus 14.

In the case of wireless supply of power, the divided power supplying units 140, which are formed along the travel path 132, are constituted respectively from power supplying coils, and the respective coils are arranged along the travel path 132. It should be noted that the phrase "along the travel path 132" does not necessarily imply that a single set of power lines (positive electrode terminal 54p and negative electrode terminal 54n) is arranged along the travel path 132 (for example, a signal set of power lines arranged in a straight line shape).

The invention claimed is:

1. An external power supplying apparatus comprising:
a power supplying device disposed along a travel path and configured to supply electrical power to a power receiving device of an electric vehicle during traveling; and a voltage applying unit configured to apply a voltage to the power supplying device;

wherein the power supplying device includes a plurality of divided power supplying units divided along the travel path; and the voltage applying unit is configured to apply the voltage to the divided power supplying units, the voltage becoming higher along a direction of travel of the electric vehicle, wherein the plurality of divided power supplying units comprises a first power supplying unit, a second power supplying unit and a third power supplying unit successively disposed along the direction of travel of the electric vehicle, and the first power supplying unit supplies a first voltage, the second power supplying unit supplies a second voltage which is higher than the first voltage and the third power supplying unit supplies a third voltage which is higher than the second voltage.

2. The external power supplying apparatus according to claim 1, wherein:

the power supplying device is equipped with power lines disposed along the travel path and configured to come into contact with the power receiving device of the electric vehicle during traveling; and the power lines include a plurality of divided power lines divided along the travel path.

3. The external power supplying apparatus according to claim 1, the power supplying device further comprising:

a plurality of first divided power supplying units disposed on a near side in the direction of travel, output voltages thereof becoming higher along the direction of travel; and at least one second divided power supplying unit disposed on a far side in the direction of travel, an output voltage thereof being constant.

4. The external power supplying apparatus according to claim 2, wherein:

the power lines are arranged in facing relation to a side part of the electric vehicle; and on a near side of the power lines in the direction of travel, a guide member is provided, which is isolated electrically from the voltage applying unit, and is configured to guide the power receiving device of the electric vehicle toward the power lines.

5. The external power supplying apparatus according to claim 4, wherein the guide member is bent so that a facing distance in the vehicle transverse direction between the guide member and a side part of the electric vehicle narrows along the direction of travel.

6. The external power supplying apparatus according to claim 1, wherein the voltage applying unit further comprises:

a DC power source;

a plurality of transformers arranged between the DC power source and the plurality of divided power lines;

voltage sensors configured to detect output voltages of the plurality of transformers; and a transformer control device configured to control transformer ratios of the plurality of transformers based on detection values of the voltage sensors;

wherein the transformer control device is configured to control the transformer ratios by setting as fixed values target output voltages of the respective transformers.

7. A vehicle power supplying method for supplying electrical power from a power supplying device of an external power supplying apparatus disposed along a travel path to an electric vehicle during traveling, comprising the steps of:

constituting the power supplying device from a plurality of divided power supplying units divided along the travel path, wherein the plurality of divided power supplying units comprises a first power supplying unit, a second power supplying unit and a third power supplying unit successively disposed along the direction of travel of the electric vehicle; and increasing a voltage applied to the divided power supplying units along a direction of travel of the electric vehicle by applying a first voltage to the first power supplying unit, applying a second voltage which is higher than the first voltage to the second power supplying unit, and applying a third voltage which is higher than the second voltage to the third power supplying unit.

8. An external power supplying apparatus comprising:

a power supplying device disposed along a travel path and configured to supply electrical power to a power receiving device of an electric vehicle during traveling; and a voltage applying unit configured to apply a voltage to the power supplying device;

wherein the power supplying device includes a plurality of divided power supplying units divided along the travel path; and the voltage applying unit is configured to apply the voltage to the divided power supplying units, the voltage becoming higher along a direction of travel of the electric vehicle, wherein:

the power supplying device is equipped with power lines disposed along the travel path and configured to come into contact with the power receiving device of the electric vehicle during traveling; and the power lines include a plurality of divided power lines divided along the travel path, and wherein:

the power lines are arranged in facing relation to a side part of the electric vehicle; and on a near side of the power lines in the direction of travel, a guide member is provided, which is isolated electrically from the voltage applying unit, and is configured to guide the power receiving device of the electric vehicle toward the power lines.

9. The external power supplying apparatus according to claim 8, wherein the guide member is bent so that a facing distance in the vehicle transverse direction between the guide member and a side part of the electric vehicle narrows along the direction of travel.

* * * * *